(No Model.) 2 Sheets—Sheet 1.
H. FRASCH.
APPARATUS FOR PURIFYING PETROLEUM.
No. 564,920. Patented July 28, 1896.
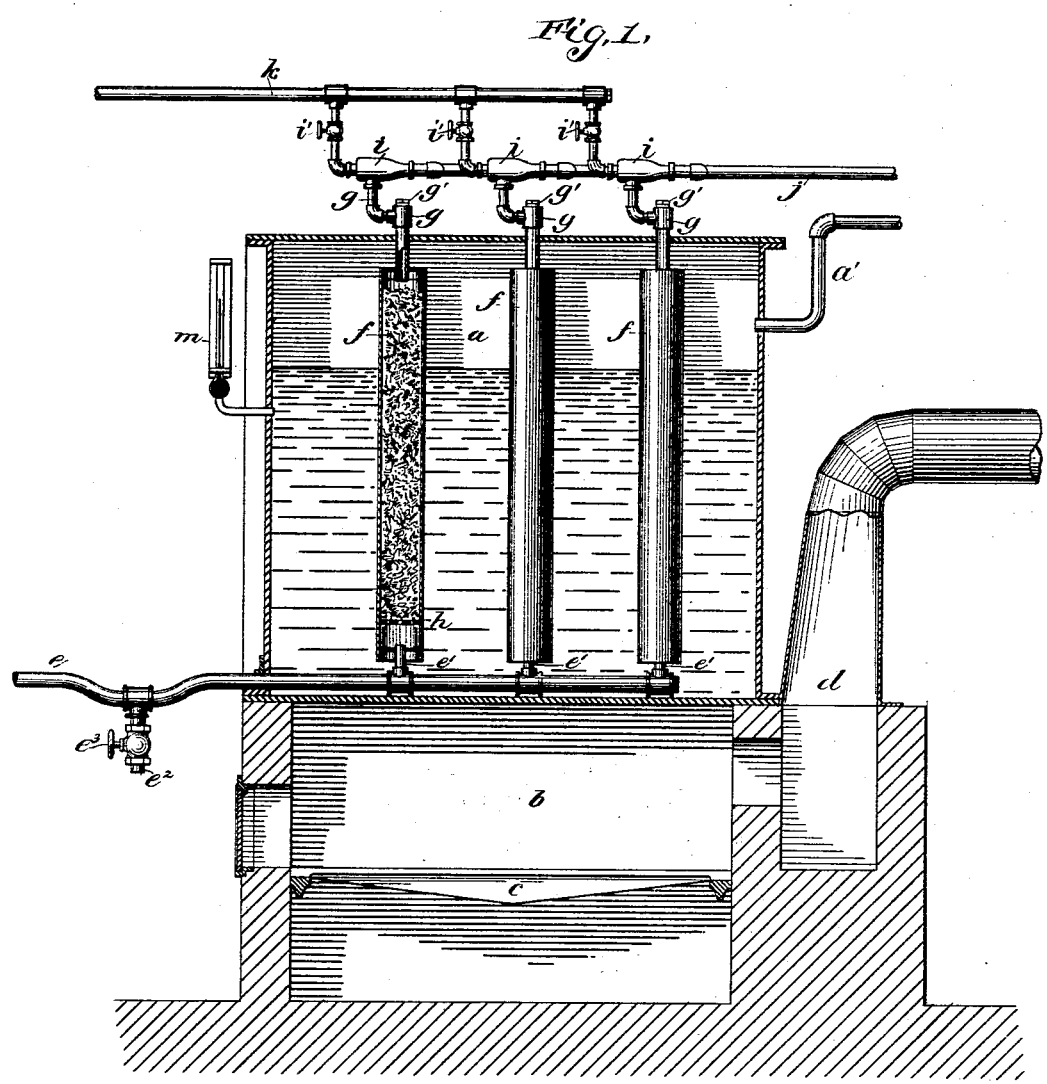

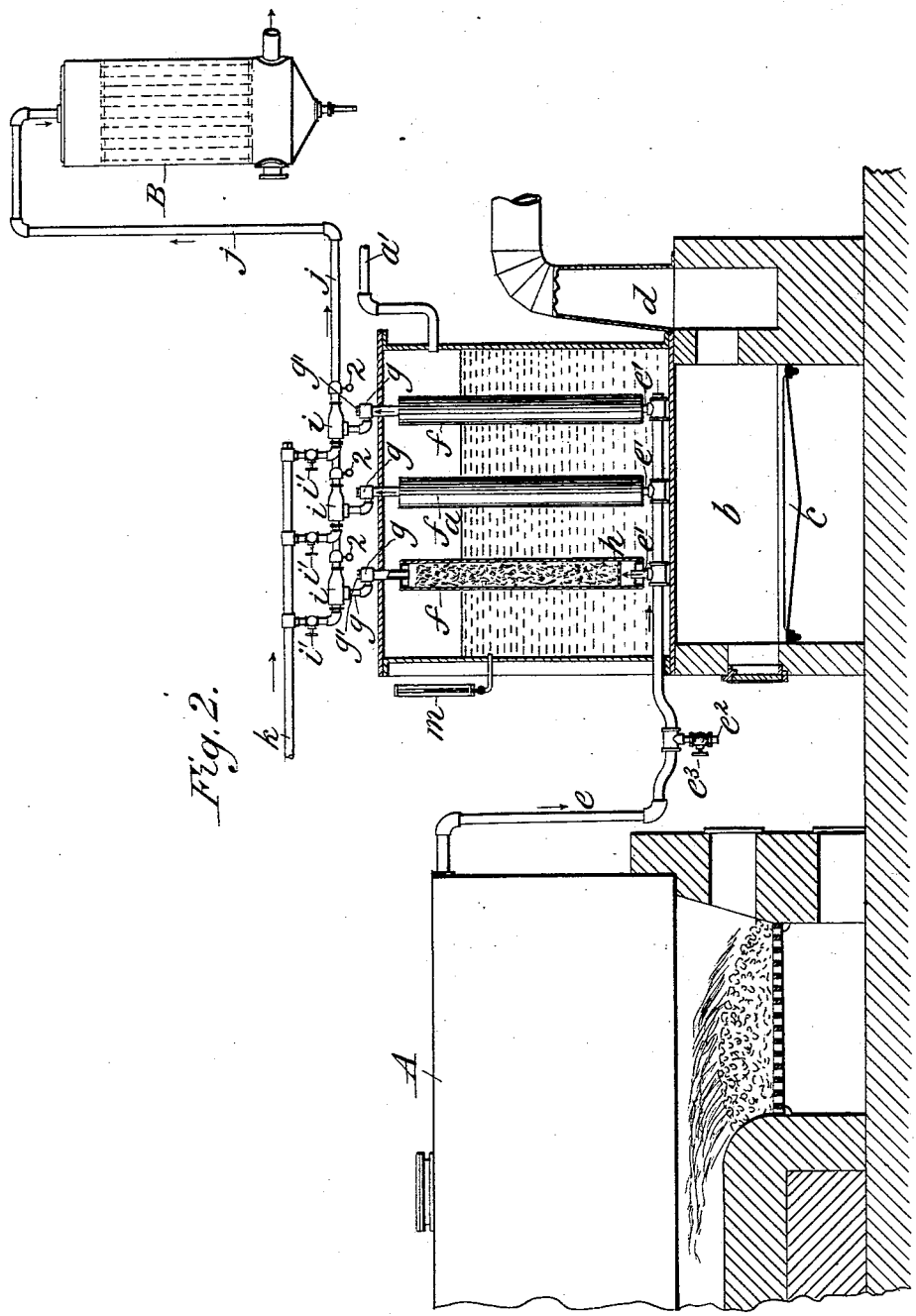

UNITED STATES PATENT OFFICE.

HERMAN FRASCH, OF CLEVELAND, OHIO, ASSIGNOR TO THE SOLAR REFINING COMPANY, OF OHIO.

APPARATUS FOR PURIFYING PETROLEUM.

SPECIFICATION forming part of Letters Patent No. 564,920, dated July 28, 1896.

Application filed October 30, 1888. Serial No. 289,524. (No model.)

*To all whom it may concern:*

Be it known that I, HERMAN FRASCH, of Cleveland, in the county of Cuyahoga and State of Ohio, have invented a new and useful Improvement in Apparatus for Purifying Petroleum; and I do hereby declare the following to be a full, clear, and exact description thereof.

My invention relates to an improvement in apparatus for the purification and deodorization of vapors of petroleum of the Canadian or Lima class, which petroleums are distinguished by the presence of a large percentage of sulfur compounds, which resist the ordinary treatment for the removal of sulfur, and which render the oil unfit for use on account of its very disgusting odor. Such oils contain sulfur in large quantities, usually over one-half of one per cent., and derive their names from the fact that they are chiefly found in Canada and at Lima, in the State of Ohio.

The process of purification to which the apparatus is especially adapted consists in passing the vapors of such petroleums through a metallic purifying material, preferably iron in a finely-divided state, such as iron borings, &c., or other suitable metals may be substituted therefor. In passing through the metallic purifying agent the sulfur compounds unite chemically with the metal and are deposited on the surface thereof in the form of metallic sulfids. In practical demonstration of this process I have found that it cannot be employed on a commercial scale without the use of a large number of columns or filters, which are charged with the metallic purifying agent, and are separately connected with the vapor-outlet or vapor-space of the still, so that the petroleum-vapors shall pass therethrough, the size of column which I have found best adapted to the purpose being a cylindrical column of about six feet in height and eight inches in diameter. The use of a single column of large area will not answer the purpose. In the use of a large number of such small columns, it is practically impossible, without employing some special appliances for the purpose, to maintain a uniform passage of the vapors in each of the columns, as the vapor from the still will pass through the column offering the least resistance in much greater quantities than through the columns which offer greater resistance. The difference in velocity with which the vapors pass through the columns produces different degrees of desulfurization, and consequently an imperfectly deodorized and purified product.

My invention consists in certain particulars of construction of the apparatus, which are indicated in the following claims.

The accompanying drawings show in vertical section a heating apparatus containing several columns, which are constructed in accordance with the principles of my invention, Figure 1 showing the said apparatus by itself, and Fig. 2 showing it interposed between the still and condenser.

In the drawings, $a$ represents a chamber or vessel, in which the purifying-columns are set, and $b$ is a fire-chamber below the vessel $a$, having grate-bars $c$ and a waste-flue $d$. This furnace forms the means by which the vessel $a$ is heated, though, if desired, it may be otherwise heated, for example, by the same furnace which supplies heat to the main still.

$e$ is the vapor-pipe leading from the oil-still A, Fig. 2, into the vessel $a$, and $f\,f$ are the columns containing the purifying material. These columns are independently connected with the vapor-pipe $e$ by branches $e'$, which enter the base of the column beneath the perforated grating or support $h$, which is supported within the column a little distance above the bottom thereof. The iron borings or other purifying metallic agent are charged into the columns and rest upon the gratings $h$. In the drawings I have shown one of the columns in section for the purpose of illustrating this construction. The other columns are similarly arranged, and although I have shown only three columns it should be understood that in practice a much greater number than this is desirable. At the top each column is connected by a short pipe or neck $g$ with an exhauster of suitable construction, such as a steam-ejector $i$, the nozzle of which leads into a vapor-pipe $j$, extending to the condenser B, Fig. 2. The ejectors $i$ are supplied with steam from a steam-pipe $k$, and each ejector is provided with a valve $i'$, by which the quantity of steam supplied to each may be regulated.

The operation of the apparatus in the purification of oil is as follows: The vessel $a$ is filled or partially filled with a liquid adapted to withstand the temperature used for purifying, such as molten metal of low-fusing temperature or a heavy oil, which liquid surrounds the column and that part of the vapor-pipe $e$ which is within the vessel. The purpose of thus arranging the columns within the vessel $a$ is to insure the uniform heating of all of them, since I have found that unless the columns are heated to the same temperature good results are not obtainable. When heavy oil is used in the tank as the medium for transmitting heat to the columns, I employ a pipe $a'$, which leads to a condenser for the purpose of carrying off and liquefying any of the heavy oil which may be vaporized by the heat of the furnace.

The vessel $a$ and the liquid therein contained are heated by the furnace $b$, and the temperature of the liquid is regulated to the proper degree by the operator, a thermometer $m$ indicating the degree of heat. The vapor from the still passes through the pipe $e$ and connections $e'$ into the bases of the columns $f$, and by reason of the supporting of the purifying material on the gratings $h$ the extremities of the short pipes $e'$ are not apt to be clogged, and a large area is afforded for the entrance of the vapors into the columns. As the vapors pass through the columns their sulfur compounds are combined with the metallic purifying agent, as above indicated, and the deodorized and purified vapors pass through the pipes $g$, steam-ejectors $i$, and thence to the pipe $j$, which leads to the condenser, or separate condensers may be used.

A blast of steam is maintained in the ejectors $i$ from the pipe $k$, and creates a suction which tends to draw the vapors through the purifying-columns, and by regulating the quantity of steam discharged into the ejectors, the velocity of the passage of the vapors through the columns may be governed. This regulation may be effected by controlling the supply of steam of each ejector separately, so as to make the suction on the column conform to the resistance afforded by the contained purifying material, but even without such individual regulation a substantial uniformity and equality in the quantity of vapors passed through each may be maintained by supplying all the ejectors from a common steam-pipe, having equal access to each, because if the resistance of a particular column be such as tends unduly to check the flow through it, the jet produces a higher degree of vacuum, and thus the passage of the vapors then depends much less on the resistance of the contents of the columns than when no means for exhausting the vapors is employed. Instead of using individual exhausters for each column one exhauster may be employed for several, and the exhausters may be modified in construction and arrangement.

Information for adjusting the flow through the columns can be obtained most readily by observation of the purified hydrocarbons after or before condensation. With the bath at a proper temperature too long retention of the vapors in a column induces more or less decomposition of the hydrocarbons, which decomposition the skilled operator can readily detect by examination of the hydrocarbons as to odor or color, or both, while, on the other hand, an insufficient exposure results in a failure to desulfurize the oil. It is not essential that the hydrocarbons for every column should be separately examined, for if the mixed product from several is not as it should be, comparative trials with different exhausters may serve to show in which column or columns the faulty action is occurring; but in Fig. 2 a small vent-plug 2 is shown beyond each exhauster, so that by removing the plug a small portion of vapor can be drawn off, and if separate condensers be used (as hereinbefore suggested) the separate distillates could of course be examined independently.

The expression of "exhausters" in the claims following is not to be understood as restricting them to an exhauster for each column, although that is the preferable arrangement, nor necessarily to more exhausters than one, for any exhauster arrangement adapted to aid in counteracting differences in the resistance of the several columns could be used and would be substantially the exhausters of said claims. Neither is the expression of "a condenser" in the claims to be understood as excluding the use of more condensers than one, as, for example, separate condensers for the columns.

I claim as my invention—

1. In combination with an oil-still, and a condenser, a purifying apparatus comprising a vessel containing a liquid bath, a number of columns of small diameter containing purifying material arranged in said vessel and surrounded by said bath, pipe connections between the vapor-space of said still and the column-inlets severally so that every column receives its several portion of vapors given off together from the same body of oil in distillation, pipe connections between the column-outlets and said condenser, and exhausters in communication with the said column-outlets arranged to aid in counteracting differences in the resistance of the said columns, substantially as described.

2. In combination with an oil-still, and a condenser, a purifying apparatus comprising a number of columns of small diameter containing purifying material, column-heating means independent of the means for heating the still, pipe connections between the vapor-space of said still and the column-inlets severally so that every column receives its several portion of vapors given off together from the same body of oil in distillation, pipe connections between the column-outlets and said condenser, and exhausters in communication with the said column-outlets arranged to aid in counteracting differences in the resistance of said columns, substantially as described.

3. In combination with an oil-still, and condenser, a number of columns of small diameter to admit of uniform heating throughout, containing purifying material and connected abreast of one another with the still on their inlet and with the condenser on their outlet sides, means whereby said columns may be uniformly heated, and exhausters connected with the outlets from said columns and adapted to effect a differential lowering of pressure at the outlets of the different columns as occasion may require to counteract a difference of resistance; substantially as described.

4. In combination with an oil-still, and a condenser, a purifying apparatus comprising a vessel containing a liquid bath, a number of columns of small diameter containing purifying material arranged in said vessel and surrounded by said bath, means whereby the said columns may be heated through said bath, pipe connections between the vapor-space of said still and the column-inlets severally, so that every column receives its several portion of vapors given off together from the same body of oil in distillation, pipe connections between the column-outlets and said condenser, and means whereby the passage of vapors through the different columns may be regulated, substantially as described.

In testimony whereof I have hereunto set my hand this 11th day of October, A. D. 1888.

HERMAN FRASCH.

Witnesses:
W. B. CORWIN,
J. K. SMITH.